US00RE46587E

(19) United States
(12) Reissued Patent
Wang et al.

(10) Patent Number: US RE46,587 E
(45) Date of Reissued Patent: Oct. 24, 2017

(54) RESISTIVE TOUCH DEVICE WITHOUT PERCEPTION OF COLOR DIFFERENCE

(71) Applicants: Wistron Corporation, New Taipei (TW); eTurboTouch Technology Inc., Taoyuan (TW)

(72) Inventors: Kuei-Ching Wang, New Taipei (TW); Yu-Heng Hsieh, New Taipei (TW); Ta-Hu Lin, New Taipei (TW); Tung-Hsin Liu, New Taipei (TW)

(73) Assignees: Wistron Corporation, New Taipei (TW); eTurboTouch Technology Inc., Taoyuan (TW)

(21) Appl. No.: 14/730,243

(22) Filed: Jun. 4, 2015

Related U.S. Patent Documents

Reissue of:

(64) Patent No.: 8,497,848
Issued: Jul. 30, 2013
Appl. No.: 13/050,357
Filed: Mar. 17, 2011

(30) Foreign Application Priority Data

Feb. 11, 2011 (TW) ..... 100104647 A

(51) Int. Cl.
*G06F 3/045* (2006.01)
*G06F 3/044* (2006.01)

(52) U.S. Cl.
CPC ..... *G06F 3/044* (2013.01); *G06F 3/045* (2013.01)

(58) Field of Classification Search
CPC ..... G06F 3/045
See application file for complete search history.

(56) References Cited

U.S. PATENT DOCUMENTS 4,620,062 A 10/1986 Mizzi
5,062,198 A 11/1991 Sun
(Continued)

FOREIGN PATENT DOCUMENTS

DE 10 2009 014 757 A1 10/2010
JP H10910350 A 4/1998
(Continued)

OTHER PUBLICATIONS

Search Report mailed/issued on Oct. 20, 2016 for EP application No. 12154121.3, filing date Feb. 6, 2012, pp. 1-9.
(Continued)

*Primary Examiner* — Cameron Saadat
(74) *Attorney, Agent, or Firm* — Winston Hsu

(57) ABSTRACT

A resistive touch device with no visual color difference comprises a first transparent conductive substrate, a second transparent conductive substrate and a spacer layer. The first transparent conductive substrate with a bottom thereof has a plurality of first transparent conductive electrodes, and a first voltage difference in a first direction. The second transparent conductive substrate with a top thereof has a plurality of second transparent conductive electrodes, and a second voltage difference in a second direction. The first direction is perpendicular to the second direction. The spacer layer is formed between the first and second transparent conductive substrates, which is used for isolating the first transparent conductive electrode and the second transparent conductive electrode. The first transparent conductive electrodes are configured to comply with certain specifications included a differential value of Euclidean distance, a yellow/blue dif-
(Continued)

ferential value in a color space, or dimensions between each adjacent electrodes.

34 Claims, 9 Drawing Sheets

(56) References Cited

U.S. PATENT DOCUMENTS

| | | | | |
|---|---|---|---|---|
| 2008/0204829 | A1* | 8/2008 | Harrington | 358/504 |
| 2010/0007619 | A1 | 1/2010 | Jiang | |
| 2010/0182278 | A1* | 7/2010 | Li et al. | 345/174 |
| 2010/0260986 | A1 | 10/2010 | Ito | |
| 2010/0302180 | A1* | 12/2010 | Chang et al. | 345/173 |
| 2011/0007010 | A1* | 1/2011 | Chen et al. | 345/173 |
| 2011/0267630 | A1* | 11/2011 | Mestha et al. | 358/1.9 |
| 2012/0193130 | A1 | 8/2012 | Fix | |

FOREIGN PATENT DOCUMENTS

| | | | |
|---|---|---|---|
| JP | 201020768 | A | 1/2010 |
| WO | 0157579 | A2 | 8/2001 |

OTHER PUBLICATIONS

Search Report mailed/issued on Jan. 20, 2017 for EP application No. 12154121.3, pp. 1-15.
Office action mailed on Feb. 12, 2013 for the Japan application No. 2011-064128, filed: Mar. 23, 2011, p. 1 line 10-31 and p. 2 line 1-22 Translation.

* cited by examiner

RESISTIVE TOUCH DEVICE WITHOUT PERCEPTION OF COLOR DIFFERENCE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

The present invention relates a touch device, especially to a resistive touch device without perception of color difference.

BACKGROUND

Electrical devices containing a touch panel such as a personal digital assistant (PDA), a mobile phone a tablet personal computer (i.e., tablet PC) is more popular with techniques improvement. Touch panels are classified into several types and a resistive touch panel is a most representative type.

In general, a resistive touch panel refers touching the surface of the touch panel with a finger or other objects, which makes a voltage change in two contacted electrode layers inside the touch panel. The touch panel then detects the voltage change for indicating a touched position on the surface of the touch panel. As shown in FIG. 1, a touch panel comprises a first substrate 10, a spacing layer 12 and a second substrate 14. The first substrate 10 and the second substrate 14 are used to respectively detect a position along the X- and Y-axle of an input point. Multiple first electrodes 16 and second electrodes 18 are formed respectively on and between the first substrate 10 and the second substrate 14. The spacing layer 12 is tiny and dotted distributed between the first substrate 10 and the second substrate 14. While the first substrate 10 and the second substrate 14 touching each other, a particular first electrode 16 and a particular second electrode 18 form a contact that provide a short voltage for calculating the X- and Y-position of the contact.

However, the electrodes are generally either photographed in patterns by etching or formed in strips by coating and the shape of the electrode will influent the displaying performance and have drawbacks on noticeable perception for a person.

Some Exemplary Embodiments

These and other needs are addressed by the exemplary embodiments, in which one approach provided for improving displaying quality and reducing perception of color difference of a resistive touch device, which by configuring differential values of Euclidean distance and a yellow/blue differential value Δb*, or dimensions between each adjacent electrodes.

According to one aspect of an embodiment, a resistive touch device with no visual color difference comprises a first transparent conductive substrate, a second transparent conductive substrate and a spacer layer. The first transparent conductive substrate has a plurality of first transparent conductive electrodes formed on a bottom of the first transparent conductive substrate, and the each first transparent conductive electrode has a first voltage difference in a first direction. The second transparent conductive substrate has a plurality of second transparent conductive electrodes formed on a top of the second transparent conductive substrate, and the each second transparent conductive electrode has a second voltage difference in a second direction. The first direction is perpendicular to the second direction. The spacer layer is formed between the first transparent conductive substrate and the second transparent conductive substrate, which is used for isolating the first transparent conductive electrodes and the second transparent conductive electrodes.

The first transparent conductive electrodes of the first transparent conductive substrate are configured to comply with certain specifications included an optic condition, a dimensional condition or both. The optic condition defines a differential value of Euclidean distance ΔE, and the differential value of Euclidean distance ΔE can be determined according to a differential value of lightness ΔL' a yellow/blue differential value Δb* of positions between a yellow and blue coordinates, and a red/green differential value Δa* of positions between red and green coordinates in a color space, which is provided with following relationship:

$$\Delta E=\sqrt{(\Delta L)^2+(\Delta a^*)^2+(\Delta b^*)^2}$$

The optic condition defines the differential value of Euclidcan distance ΔE of the first transparent conductive electrode may be smaller than 5 and the yellow/blue differential value Δb* may be smaller than 1.5 when light emitted through the first transparent conductive substrate, and simultaneously defines the differential value of Euclidean distance ΔE of the first transparent conductive electrode may be smaller than 10 when light reflected from the first transparent conductive substrate. The dimensional condition defines each of the adjacent first transparent conductive electrode may have a distance of gap in a range from 50 to 1000 micro-meters.

Still other aspects, features, and advantages of the exemplary embodiments are readily apparent from the following detailed description, simply by illustrating a number of particular embodiments and implementations, including the best mode contemplated for carrying out the exemplary embodiments. The exemplary embodiments are also capable of other and different embodiments, and their several details can be modified in various obvious respects, all without departing from the spirit and scope of the exemplary embodiments. Accordingly, the drawings and description are to be regarded as illustrative, and not as restrictive.

BRIEF DESCRIPTION OF THE DRAWINGS

The exemplary embodiments are illustrated by way of examples, and not by way of limitation, in the figures of the accompanying drawings in which like reference numerals refer to similar elements and in which.

DETAILED DESCRIPTION OF THE EMBODIMENT

Figure 1:
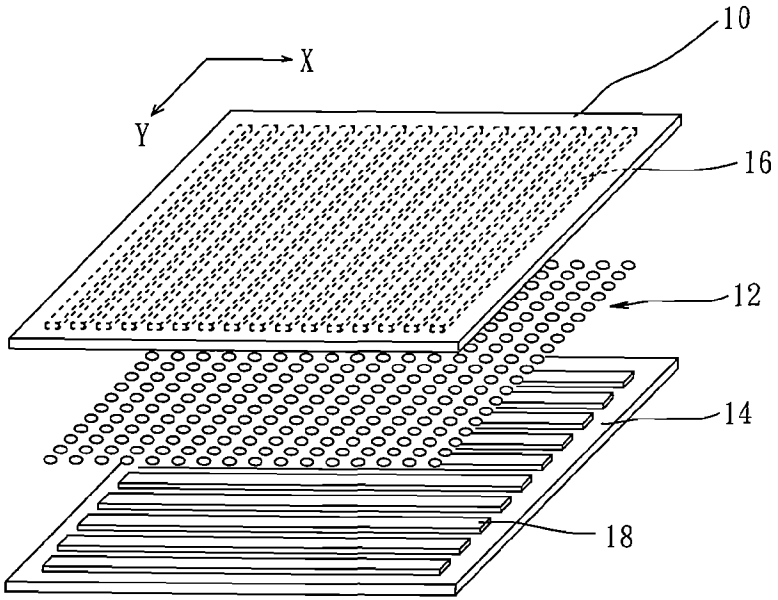
Fig. 1 (prior art)
FIG. 1 is a diagram of a conventional touch panel.
Figure 2:
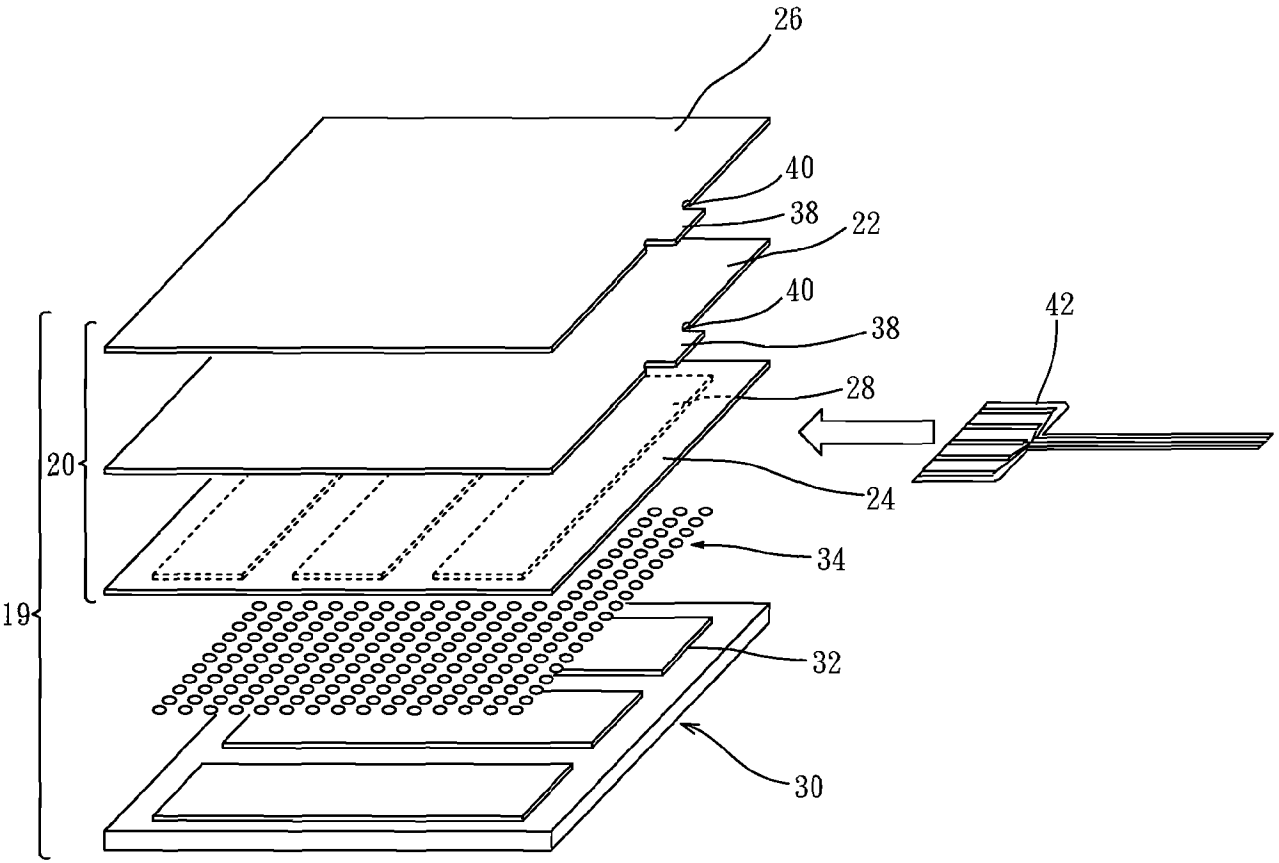
FIG. 2 is a diagram of a touch panel according to an embodiment of the present invention.
Figure 3:
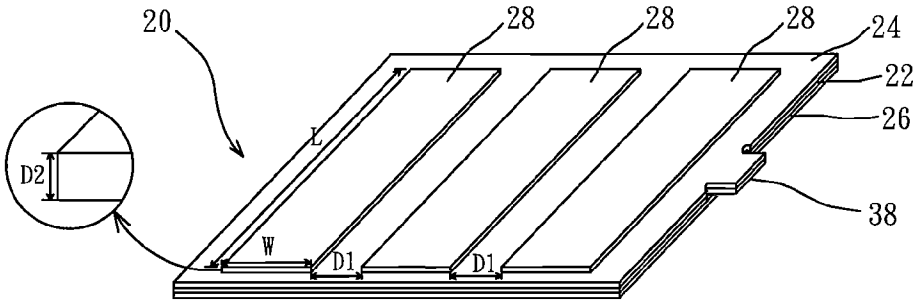
FIG. 3 is a bottom view of a perspective diagram a first transparent conductive substrate according to an embodiment of the present invention.

With reference to FIGS. 2 and 3, a touch panel 19 according to an embodiment of the present invention comprises a first transparent conductive substrate 20. The first transparent conductive substrate 20 comprises a transparent substrate 22 that is made from a high molecular weight polymer transparent material selected from a group consisting of a Polyethylene Terephthalate (PET), Zeonor, Polycarbonate (PC), Polymethyl Methacrylate (PMMA), Polyarylate (PAR), Triacetyl cellulose (TAC) and Poly ethylene 2,6-naphthalene dicarboxylate (PEN). The first transparent conductive substrate 20 further comprises a hard coating layer 26, a plurality of first transparent conductive electrodes 28 and an optional anit-Newton ring layer 24. The hard coating layer 26 is disposed on a top of the transparent substrate 22 and is used for protection. In this embodiment. as shown in FIG. 2, the anit-Newton ring layer 24 is disposed on a bottom of the transparent substrate 22, and is used for avoiding phenomena of light diffraction. The first transparent conductive electrodes 28 are arranged in parallel disposed on a bottom of the anti-Newton ring layer 24. Each of the first transparent conductive electrode 28 has a first voltage difference in a first direction, and is made from a transparent conductive material selected from a group consisting of an indium tin oxide (ITO), quasi-metallic material and other high molecular weight material. In another embodiment, the first transparent conductive electrodes 28 are disposed on a bottom of the transparent substrate 22 directly without having the anti-Newton ring layer 24.

In order to make a person has no noticeable perception to notches or distances between the first transparent conductive electrodes 28, the first transparent conductive electrodes 28 of the first transparent conductive substrate 20 are configured to comply with certain specifications included an optic condition, a dimensional condition or both. The optic condition defines a differential value of Euclidean distance ΔE, and the differential value of Euclidean distance ΔE can be determined according to a differential value of lightness ΔL' a yellow/blue differential value Δb* of positions between a yellow and blue coordinates, and a red/green differential value Δa* of positions between red and green coordinates in a color space, which is provided with following relationship:

$$\Delta E=\sqrt{(\Delta L)^2+(\Delta a^*)^2+(\Delta b^*)^2}$$

The optic condition defines the differential value of Euclidean distance ΔE of the first transparent conductive electrode 28 may be smaller than or equal to 5 and the yellow/blue differential value Δb* may be smaller than or equal to 1.5 when light emitted through the first transparent conductive substrate 20, and simultaneously defines the differential value of Euclidean distance ΔE of the first transparent conductive electrode 28 may be smaller than or equal to 10 when light reflected from the first transparent conductive substrate. In this embodiment, the Euclidean distance ΔE is smaller than or equal to 2, and the yellow/blue differential value Δb* is smaller than or equal to 1.2 as light emitted through the first transparent conductive substrate 20, and the Euclidean distance ΔE of the first transparent conductive electrode 28 is smaller or equal to 7 as light reflected from the first transparent conductive substrate 20.

The dimensional condition defines each of the adjacent first transparent conductive electrode 28 may have a distance of gap D1 in a range from 50 to 1000 micro-meters. In this embodiment, the distance D1 for the each adjacent first transparent conductive electrode 28 is in a range of 50 to 400 micro-meters.

The touch panel 19 further comprises a second transparent conductive substrate 30 and a spacer layer 34. The second transparent conductive substrate 30 aligned to the first transparent conductive substrate 20 with an interval, and comprises a plurality of second transparent conductive electrodes 32 disposed on a top of the second transparent conductive substrate 30. Each second transparent conductive electrode 32 has a second voltage difference in a second direction, and is made from a transparent conductive material selected from a group consisting of an indium tin oxide (ITO), quasi-metallic material and other high molecular weight material. As shown in FIG. 2, the first direction is perpendicular to the second direction, and the second transparent conductive electrode 32 is perpendicular to the first transparent conductive electrode 28. The spacer layer 34 is disposed between the first transparent conductive substrate 20 and the second transparent conductive substrate 30, and is used for isolating the first transparent conductive electrodes 28 and the second transparent conductive electrodes 30.

Further, as shown in the first transparent conductive substrate 20 of FIG. 2. Since the transparent substrate 22 has a shape consistent with a shape of the hard coating layer 26, an install portion 38 is protruded from and mounted on an edge of the transparent substrate 22 and the hard coating layer 26 respectively. Notches 40 are formed at a joint of the edge and the install portion 38, for providing ease to remove a flexible cable or a flexible printed circuit board with chips 42 installed to the install portion.

Figure 4:
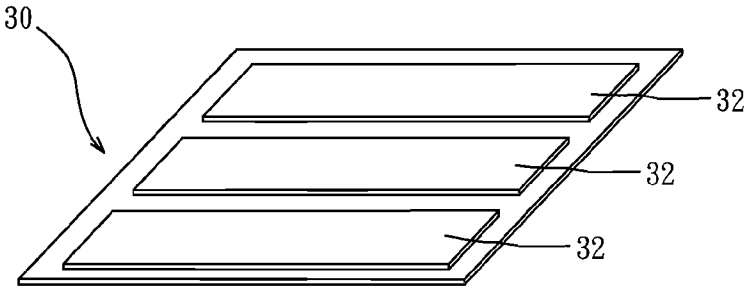
FIG. 4 is a top view of a perspective diagram of a second transparent conductive substrate according to an embodiment of the present invention.

It is noted that in pervious example, the first transparent conductive substrate 28 is configured to a certain dimensional condition that improve the visual appearance. With reference to FIGS. 3 and 4, an exemplary embodiment illustrated for introducing dimension and resistance relations of the first transparent conductive substrate 28 and the second transparent conductive substrate 32. The first transparent conductive substrate 28, as shown in FIG. 3, is in a cuboid and comprises two longitudinal edges L, two latitudinal edges W and a thickness D2. Width of the latitudinal edge W may be in a range from 8 to 30 millimeters, the thickness D2 may be in a range from 50 to 700 angstroms. In this embodiment the width of the latitudinal edges W is in a range of 10 to 15 millimeters, and the thickness D2 is in a range of 100 to 400 angstroms.

When a voltage is applied crossed the latitudinal edges of the first transparent conductive substrate 28, a resistance of the first transparent conductive substrate 28 may be smaller than or equal to 40 thousand ohm. In this embodiment, the resistance is in a range of 1 and 25 thousand ohm. As for aspect of resistance design, the first transparent conductive substrate 28 comprises a maximum value $R_{max}$, a minimum value $R_{min}$ and an average value $R_{av}$. The resistance of the first transparent conductive substrate 28 can be set with a relationship of: $(R_{max}-R_{min})/R_{av}\leq 50\%$. In this embodiment, such relationship is set below or equal to 25%. Similarity, the second transparent conductive substrate 32 is also a cuboid that has two longitudinal edges and two latitudinal edges. A resistance may be smaller than or equal to 40 thousand ohm as a voltage applied across the latitudinal edges of the second transparent conductive substrate 32, in this embodiment, the resistance of the second transparent conductive substrate 32 is smaller than or equal to a range of 1 and 25 thousand ohm.

Figure 5A:
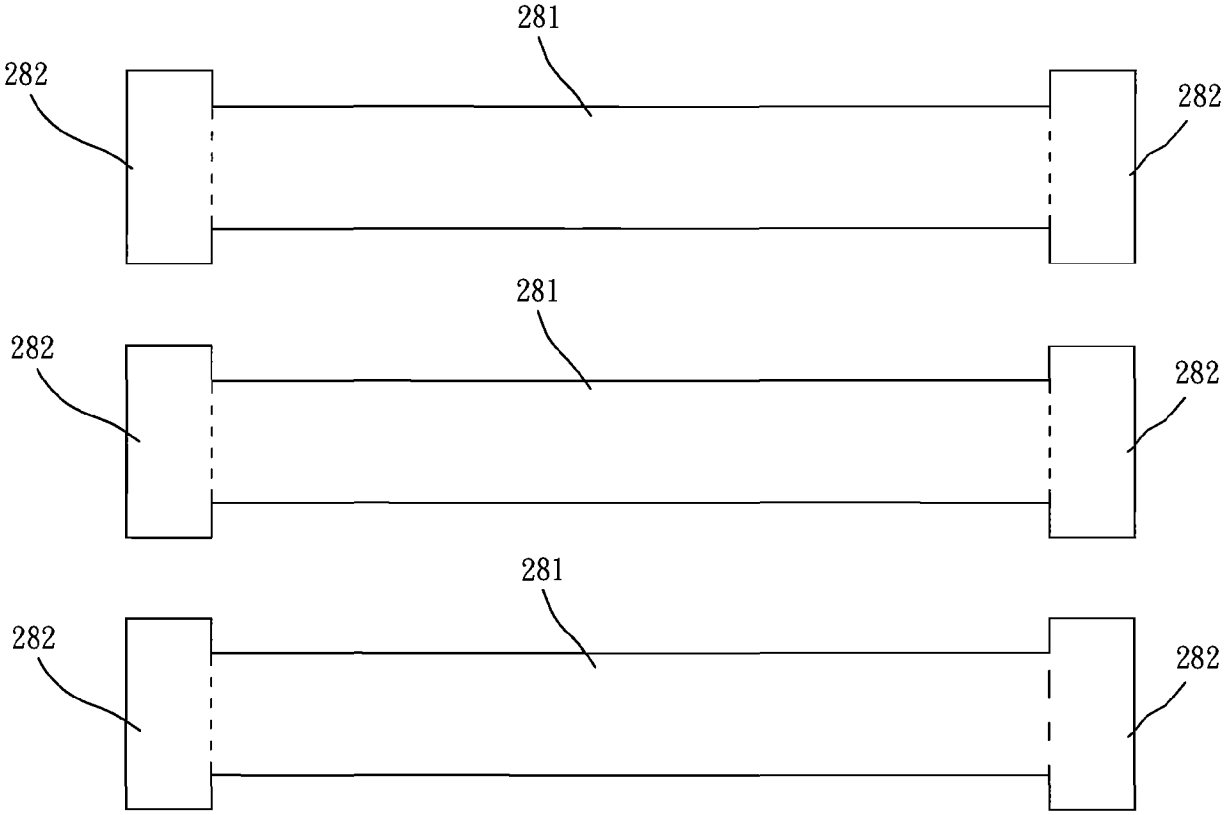
FIGS. 5(a) to 5(d) are exemplary illustrations showing shapes of the first and the second transparent conductive electrodes according to embodiments of the present invention.
Figure 5B:
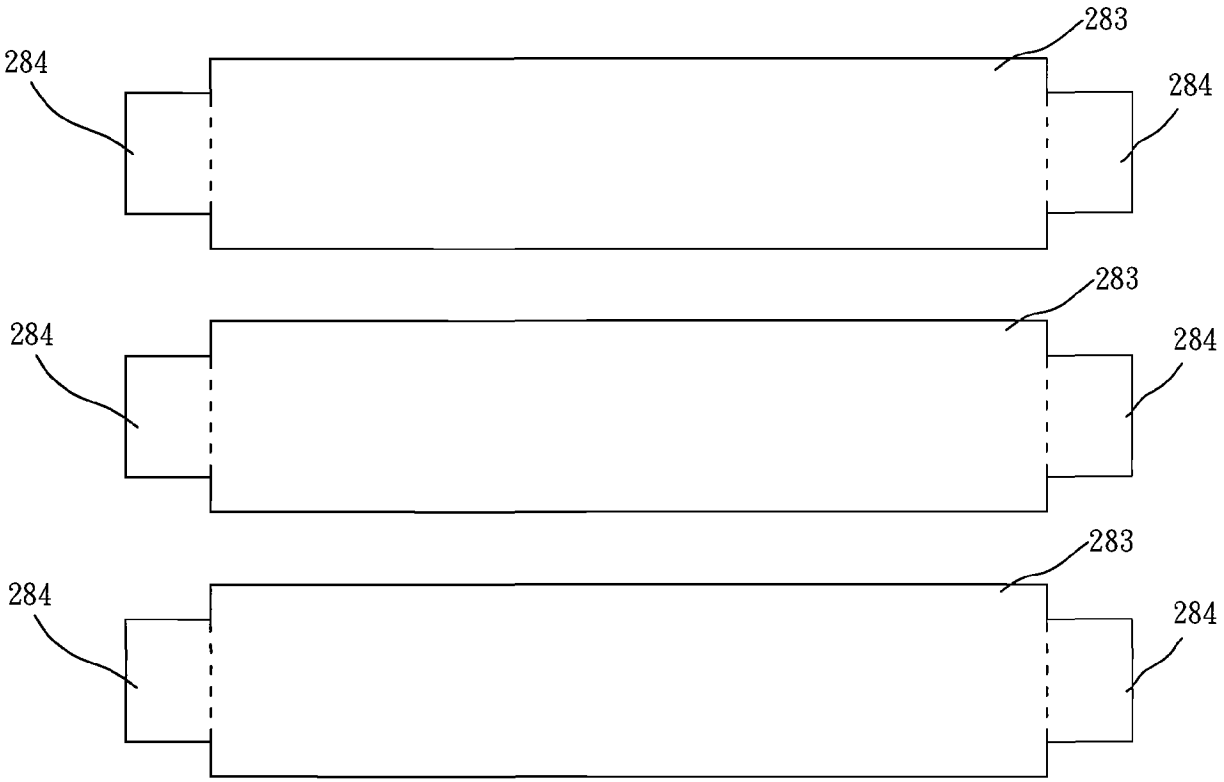

Top surfaces and bottom surfaces of the first transparent conductive electrodes 28 and the second transparent conductive electrodes 32 as described in a shape of rectangle, various forms or shapes may also be involve in providing the first transparent conductive electrodes 28 and the second transparent conductive electrodes 32. As shown in FIG. 5(a), an embodiment is illustrated that the top surfaces and the bottom surfaces of each electrode comprises a major rectangular region 281 and two minor rectangular regions 282. Two short opposite edges of the major rectangular region 281 are connected to a long edges of the two minor rectangular regions 282, respectively. Another embodiment, as shown in FIG. 5(b), comprises a major rectangular region 281 and two minor rectangular regions 282. Two short opposite edges of the major rectangular region 281 are connected respectively to a long edges of the two minor rectangular regions 282, wherein the short edge of the major rectangular region 281 is longer than the long edges of the minor rectangular regions 282.

Figure 5C:
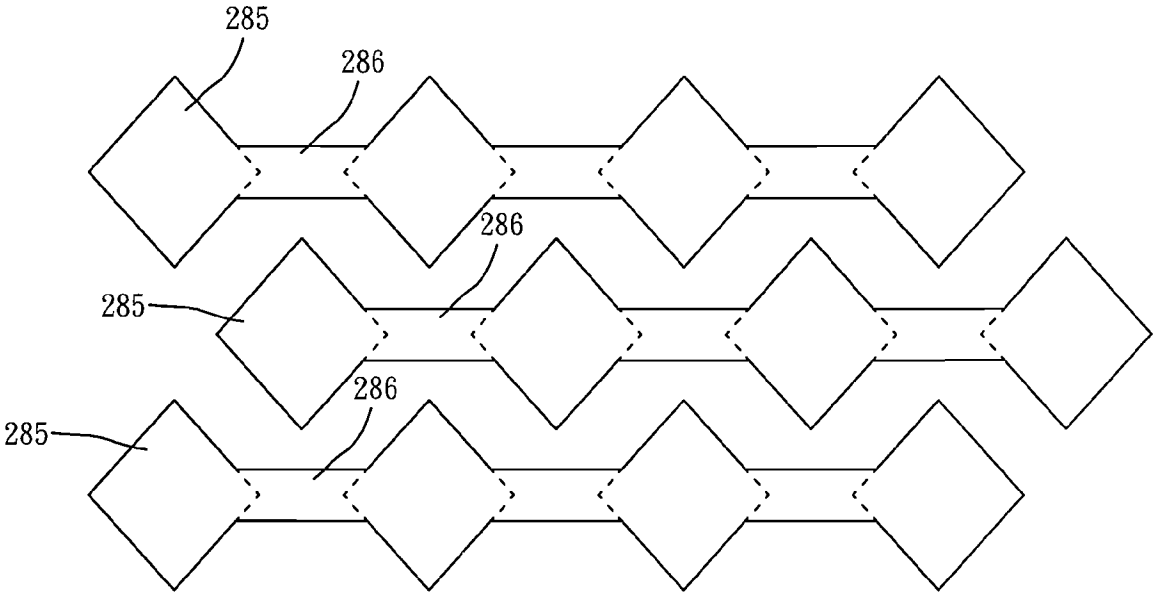

Another embodiment, as shown in FIG. 5(c), each electrode comprises a plurality of diamond regions 285 and a plurality of strip-regions 286. The diamond regions 285 and the strip-regions 286 are sequentially connected in a row, which two opposite edges of each strip-region 286 are connected respectively to a tip of the adjacent diamond region 285. The diamond regions 285 are arranged in parallel and spaced at uniform intervals. In this manner, the each diamond region 285 of the first transparent conductive electrode is disposed between two strip-regions 286 of the adjacent rows. The diamond region 285 of the second transparent conductive electrode is disposed between two strip-regions 286 of the adjacent rows.

Figure 5D:
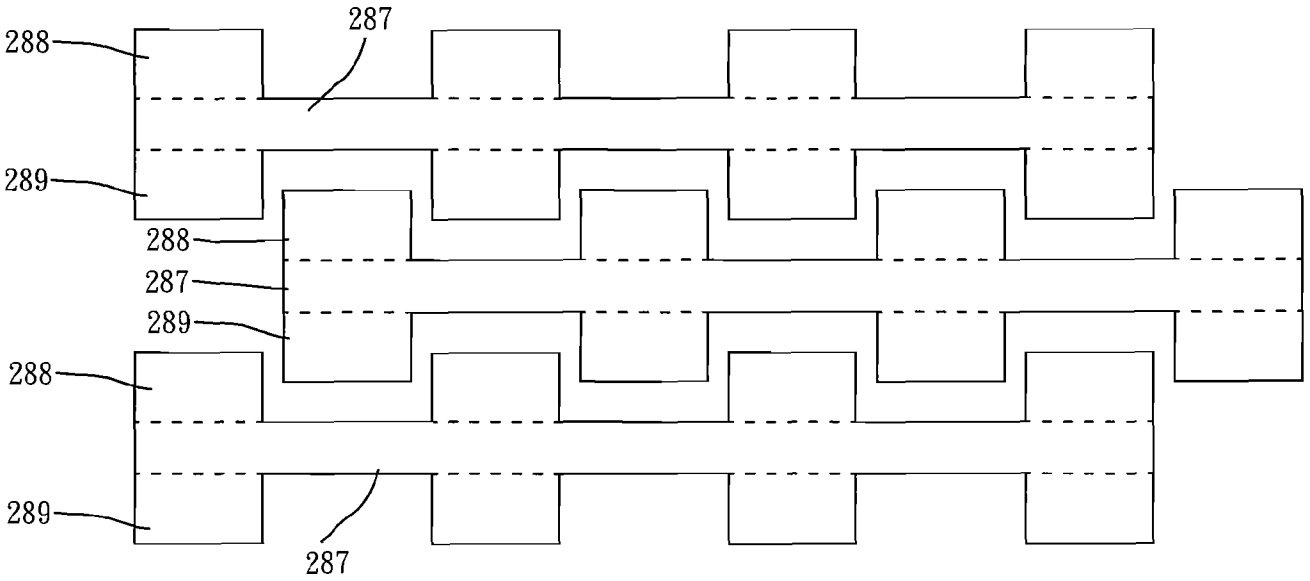

Yet another embodiment, as shown in FIG. 5(d), the top surfaces and the bottom surfaces of the first and the second transparent conductive electrode respectively comprises a major rectangular region 287, a plurality of first minor rectangular regions 288 and a plurality of second minor rectangular regions 289. Longitudinal edges of the first and the second minor rectangular regions 288, 289 are connected respectively to two longitudinal edges of the major rectangular region 287, and the major rectangular regions 287 are spaced at uniform intervals. In this manner, each adjacent first and the second minor rectangular regions 288, 289 are interlaced arranged between two adjacent first transparent conductive electrodes. Each adjacent first and the second minor rectangular regions 288, 289 are interlaced arranged between two adjacent second transparent conductive electrodes.

Figure 6:
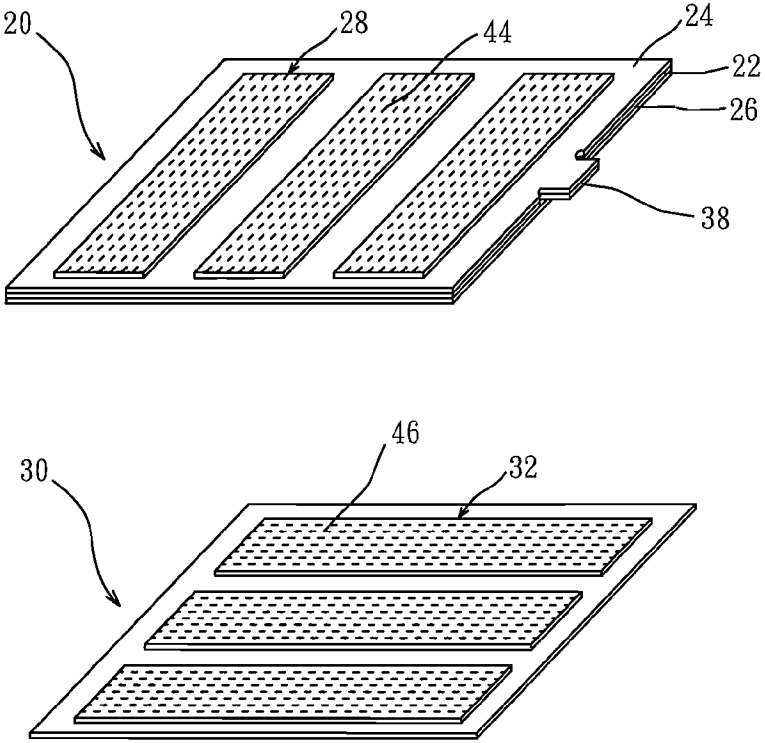
FIG. 6 is an exemplary diagram of electric potential lines generated on the first and the second transparent conductive electrodes according to an embodiment of the present invention.
Figure 7:
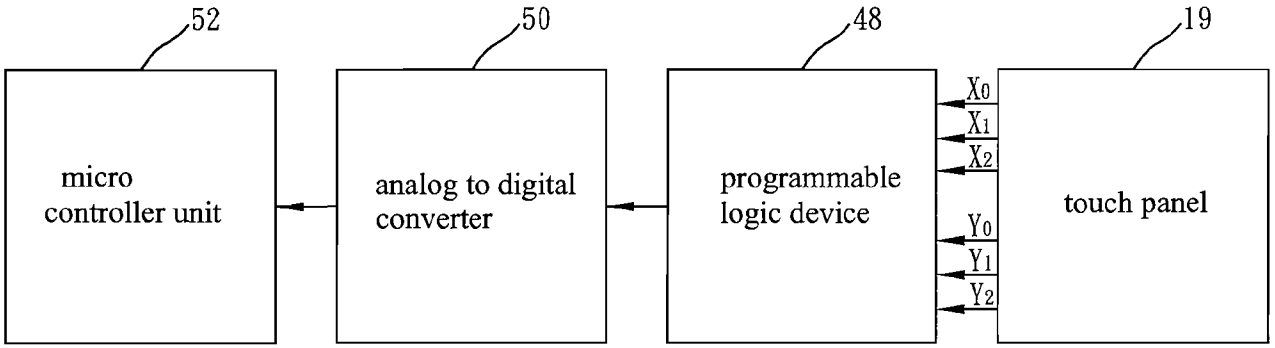
FIG. 7 is a circuit diagram according to an embodiment of the present invention.

With reference to FIGS. 6 and 7, when voltage applied to the first transparent conductive electrode 28 and the second transparent conductive electrode 32, the first voltage difference is formed on the first transparent conductive electrode 28 to the first direction that generates first electric potential lines 44 along with the first direction, and the second voltage difference is formed on the second transparent conductive electrode 32 to the second direction that generates second electric potential lines 46 along with the second direction. As the first transparent conductive electrodes 28 of the touch panel 19 has contacted with the second transparent conductive electrodes 32, the first transparent conductive electrodes 28 and the second transparent conductive electrodes 32 are sequentially connected to a programmable logic device 48, an analog to digital (A/D) converter 50 and a micro controller unit (MCU) 52.

In use, the programmable logic device 48 processes short voltages of the first transparent conductive electrodes 28 and the second transparent conductive electrodes 32, and generates analog signals corresponded to the first and second directions. The A/D converter 50 receives the analog signals from the programmable logic device 48 and converts the analog signals to digital signals corresponded to the first and second directions. Eventually, the MCU 52 generates coordinate values based on the received digital signals from the A/D converter 50.

Accordingly, the first transparent conductive substrate is configured to comply with certain specifications included the optic condition and the dimensional condition, which achieves no perception of color difference and high quality appearance.

While the exemplary embodiments have been described in connection with a number of embodiments and implementations, the exemplary embodiments are not so limited but cover various obvious modifications and equivalent arrangements, which fall within the purview of the appended claims.

Although features of the exemplary embodiments are expressed in certain combinations among the claims, it is contemplated that these features can be arranged in any combination and order.

What is claimed is:

1. A resistive touch device without perception of color difference, comprising:

a first transparent conductive substrate having a plurality of first transparent conductive electrodes formed on a bottom of the first transparent conductive substrate, each of the first transparent conductive electrode having a first voltage difference in a first direction, and being configured to comply with certain specifications included an optic condition, a dimensional condition or both, the optic condition defining a differential value of Euclidean distance $\Delta E$ of the first transparent conductive electrode to be smaller than or equal to 5 and a yellow/blue differential value $\Delta b^*$ to be smaller than or equal to 1.5 [when light emitted through the first transparent conductive substrate], and simultaneously defines a differential value of Euclidean distance $\Delta E$ of the first transparent conductive electrode to be smaller than or equal to 10 [when light reflected from the first transparent conductive substrate], and the dimensional condition defining the each adjacent first transparent conductive electrode having a distance of gap in a range from 50 to 1000 micro-meters, wherein the differential value of Euclidean distance $\Delta E$ of the optic condition is determined according to a differential value of lightness $\Delta L$ the yellow/blue differential value $\Delta b^*$, and a red/green differential value $\Delta a^*$ in a color space, which is provided with following relationship of $\Delta E=\sqrt{(\Delta L)^2+(\Delta a^*)^2+(\Delta b^*)^2}$;

a second transparent conductive substrate being aligned to the first transparent conductive substrate with an interval, and comprising a plurality of second transparent conductive electrodes disposed on a top of the second transparent conductive substrate, each of the second transparent conductive electrode having a second voltage difference in a second direction and the second direction being perpendicular to the first direction; and a spacer layer being disposed between the first transparent conductive substrate and the second transparent conductive substrate, and being used for isolating the first transparent conductive electrodes and the second transparent conductive electrodes.

2. The resistive touch device as claimed in claim 1, wherein the first transparent conductive substrate further comprises a transparent substrate that has the first transparent conductive electrodes disposed on a bottom of the transparent substrate.

3. The resistive touch device as claimed in claim 2, wherein the first transparent conductive substrate further comprises a hard coating layer, and the hard coating layer is disposed on a top of the transparent substrate.

4. The resistive touch device as claimed in claim 2, wherein the first transparent conductive substrate further comprises an anti-Newton ring layer, and the anti-Newton ring layer is disposed between the transparent substrate and the first transparent conductive electrodes.

5. The resistive touch device as claimed in claim 2, wherein the transparent substrate is made from a high molecular weight polymer transparent material selected from a group consisting of a Polyethylene Terephthalate (PET), Zeonor, Polycarbonate (PC), Polymethyl Methacrylate (PMMA), Polyarylate (PAR), Triacetyl cellulose (TAC) and Poly ethylene 2,6-naphthalene dicarboxylate (PEN).

6. The resistive touch device as claimed in claim 1, wherein the first transparent conductive electrode is made from a transparent conductive material selected from a group consisting of an indium tin oxide (ITO), a quasi-metallic material and a high molecular weight material.

7. The resistive touch device as claimed in claim 1, wherein the second transparent conductive electrode is made from a transparent conductive material selected from a group consisting of an indium tin oxide (ITO), a quasi-metallic material and a high molecular weight material.

8. The resistive touch device as claimed in claim 1, wherein the first transparent conductive electrodes are parallel to each other, the second transparent conductive electrodes are parallel to each other, and the first transparent conductive electrodes is perpendicular to the second transparent conductive electrodes.

9. The resistive touch device as claimed in claim 1, wherein top surfaces and bottom surfaces of the first transparent conductive electrodes and the second transparent conductive electrodes are in a shape of rectangle.

10. The resistive touch device as claimed in claim 1, wherein top surfaces and bottom surfaces of the first transparent conductive electrode and the second transparent conductive electrode respectively comprises a major rectangular region and two minor rectangular regions, and two short edges of the major rectangular region are connected to a long edges of the two minor rectangular regions, respectively.

11. The resistive touch device as claimed in claim 1, wherein top surfaces and bottom surfaces of the first transparent conductive electrode and the second transparent conductive electrode respectively comprises a major rectangular region and two minor rectangular regions, and at center positions of two short edges of the major rectangular region are connected to a long edges of the two minor rectangular regions, respectively.

12. The resistive touch device as claimed in claim 1, wherein top surfaces and bottom surfaces of the first transparent conductive electrode and the second transparent conductive electrode respectively comprises a plurality of diamond regions and a plurality of strip-regions, the diamond regions and the strip-regions are sequentially connected in a row, which two opposite edges of each strip-region are connected respectively to a tip of the adjacent diamond region, and the diamond regions are arranged in parallel and spaced at uniform intervals, wherein the each diamond region of the first transparent conductive electrode is disposed between two strip-regions of the adjacent rows, and the diamond region of the second transparent conductive electrode is disposed between two strip-regions of the adjacent rows.

13. The resistive touch device as claimed in claim 1, wherein top surfaces and bottom surfaces of the first transparent conductive electrode and the second transparent conductive electrode respectively comprises a major rectangular region, a plurality of first minor rectangular regions and a plurality of second minor rectangular regions, and longitudinal edges of the first and the second minor rectangular regions are connected respectively to two longitudinal edges of the major rectangular region, and the major rectangular regions are spaced at uniform intervals, wherein each adjacent first and the second minor rectangular regions are interlaced arranged between two adjacent first transparent conductive electrodes, and each adjacent first and the second minor rectangular regions are interlaced arranged between two adjacent second transparent conductive electrodes.

14. The resistive touch device as claimed in claim 1, wherein an install portion is protruded from and mounted on an edge of the first transparent conductive substrate.

15. The resistive touch device as claimed in claim 1, wherein an install portion is protruded from, mounted on an edge of the first transparent conductive substrate, and comprises two notches respectively formed at a joint of the edge and the install portion.

16. The resistive touch device as claimed in claim 1, wherein the differential value of Euclidean distance of the first transparent conductive electrode is smaller than or equal to 2 and the yellow/blue differential value is smaller than or equal to 1.2 [when light emitted through the first transparent conductive substrate], and the differential value of Euclidean distance of the first transparent conductive electrode is smaller than or equal to 7 [when light reflected from the first transparent conductive substrate].

17. The resistive touch device as claimed in claim 1, wherein the each adjacent first transparent conductive electrode has a distance in a range from 50 to 400 micro-meters.

18. The resistive touch device as claimed in claim 1, wherein the each first transparent conductive electrode comprises two longitudinal edges, two latitudinal edges and a thickness, width of the latitudinal edge is in a range from 8 to 30 millimeters, the thickness is in a range from 50 to 700 angstroms.

19. The resistive touch device as claimed in claim 18, wherein the width of the latitudinal edge is in a range from 10 to 15 millimeters, and the thickness is in a range from 100 to 400 angstroms.

20. The resistive touch device as claimed in claim 1, wherein the first transparent conductive substrate further comprises two longitudinal edges, two latitudinal edges and a resistance, the resistance is smaller than or equal to 40 thousand ohm, when a voltage is applied across two latitudinal edges of the first transparent conductive substrate.

21. The resistive touch device as claimed in claim 20, wherein the resistance is in a range of 1 and 25 thousand ohm.

22. The resistive touch device as claimed in claim 1, wherein each of the first transparent conductive electrode comprises a maximum value a minimum value $R_{min}$ and an average value $R_{av}$, and a resistance of the first transparent conductive substrate has a relationship of: $(R_{max}-R_{min})/R_{av} \leq 50\%$.

23. The resistive touch device as claimed in claim 22, wherein the resistance of the first transparent conductive substrate has a relationship of: $(R_{max}-R_{min})/R_{av} \leq 25\%$.

24. The resistive touch device as claimed in claim 1, wherein each of the second transparent conductive electrode comprises two longitudinal edges, two latitudinal edges and a resistance, the resistance is smaller than or equal to 40 thousand ohm, when a voltage is applied across two latitudinal edges of the second transparent conductive substrate.

25. The resistive touch device as claimed in claim 24, wherein the resistance is in a range of 1 and 25 thousand ohm.

26. The resistive touch device as claimed in claim 1, further comprising:

a programmable logic device being connected to the first transparent conductive electrodes and the second transparent conductive electrodes, and processing short voltages of the first transparent conductive electrodes and the second transparent conductive electrodes to generate analog signals corresponded to the first and second directions;

an analog to digital converter being connected to the programmable logic device, receiving the analog signals and converting the analog signals to digital signals corresponded to the first and second directions; and a micro controller unit being connected to the analog to digital converter and generates coordinate values based on the received digital signals.

*27. A resistive touch device without perception of color difference, comprising:*

*a first transparent conductive substrate having a plurality of first transparent conductive electrodes formed on a bottom of the first transparent conductive substrate, each of the first transparent conductive electrode having a first voltage difference in a first direction, and being configured to comply with an optic condition defining a differential value of Euclidean distance ΔE of the first transparent conductive electrode to be smaller than or equal to 5 and a yellow/blue differential value Δb* to be smaller than or equal to 1.5, wherein the differential value of Euclidean distance ΔE of the optic condition is determined according to a differential value of lightness ΔL, the yellow/blue differential value Δb*, and a red/green differential value Δa* in a color space, which is provided with following relationship of* $\Delta E=\sqrt{(\Delta L)^2+(\Delta a^*)^2+(\Delta b^*)^2}$;

*a second transparent conductive substrate being aligned to the first transparent conductive substrate with an interval, and comprising a plurality of second transparent conductive electrodes disposed on a top of the second transparent conductive substrate, each of the second transparent conductive electrode having a second voltage difference in a second direction and the second direction being perpendicular to the first direction; and*

*a spacer layer being disposed between the first transparent conductive substrate and the second transparent conductive substrate, and being used for isolating the first transparent conductive electrodes and the second transparent conductive electrodes.*

*28. The resistive touch device as claimed in claim 27, wherein each of the first transparent conductive electrode is configured to comply with another optic condition, a dimensional condition or both, the another optic condition defining a differential value of Euclidean distance ΔE of the first transparent conductive electrode to be smaller than or equal to 10, and the dimensional condition defining the each adjacent first transparent conductive electrode having a distance of gap in a range from 50 to 1000 micro-meters.*

*29. The resistive touch device as claimed in claim 28, wherein the differential value of Euclidean distance of the first transparent conductive electrode is smaller than or equal to 2 and the yellow/blue differential value is smaller than or equal to 1.2, and the differential value of Euclidean distance of the first transparent conductive electrode is smaller than or equal to 7.*

*30. The resistive touch device as claimed in claim 28, wherein the each adjacent first transparent conductive electrode has a distance in a range from 50 to 400 micro-meters.*

*31. A resistive touch device without perception of color difference, comprising:*

*a first transparent conductive substrate having a plurality of first transparent conductive electrodes formed on a bottom of the first transparent conductive substrate, each of the first transparent conductive electrode having a first voltage difference in a first direction, and being configured to comply with certain specifications included an optic condition, a dimensional condition or both, the optic condition defining a differential value of Euclidean distance ΔE of the first transparent conductive electrode to be smaller than or equal to 10, and the dimensional condition defining the each adjacent first transparent conductive electrode having a distance of gap in a range from 50 to 1000 micro-meters, wherein the differential value of Euclidean distance ΔE of the optic condition is determined according to a differential value of lightness ΔL, the yellow/blue differential value Δb*, and a red/green differential value Δa* in a color space, which is provided with following relationship of* $\Delta E=\sqrt{(\Delta L)^2+(\Delta a^*)^2+(\Delta b^*)^2}$;

*a second transparent conductive substrate being aligned to the first transparent conductive substrate with an interval, and comprising a plurality of second transparent conductive electrodes disposed on a top of the second transparent conductive substrate, each of the second transparent conductive electrode having a second voltage difference in a second direction and the second direction being perpendicular to the first direction; and*

*a spacer layer being disposed between the first transparent conductive substrate and the second transparent conductive substrate, and being used for isolating the first transparent conductive electrodes and the second transparent conductive electrodes.*

*32. The resistive touch device as claimed in claim 31, wherein each of the first transparent conductive electrode is configured to comply with another optical condition defining a differential value of Euclidean distance ΔE of the first transparent conductive electrode to be smaller than or equal to 5 and a yellow/blue differential value Δb* to be smaller than or equal to 1.5.*

*33. The resistive touch device as claimed in claim 32, wherein the differential value of Euclidean distance of the first transparent conductive electrode is smaller than or equal to 2 and the yellow/blue differential value is smaller than or equal to 1.2, and the differential value of Euclidean distance of the first transparent conductive electrode is smaller than or equal to 7.*

*34. The resistive touch device as claimed in claim 32, wherein the each adjacent first transparent conductive electrode has a distance in a range from 50 to 400 micro-meters.*

* * * * *